2,726,265
Patented Dec. 6, 1955

2,726,265
N-2-HYDROXY-1-(p-SULFAMYLBENZOYL) ETHYLACYLAMIDES

Walter A. Gregory, Wilmington, Del., assignor to E. I. du Pont de Nemours and Company, Wilmington, Del., a corporation of Delaware No Drawing. Application May 27, 1954, Serial No. 432,890

6 Claims. (Cl. 260—556)

This invention relates to N-[2-hydroxy-1-(p-sulfamylbenzoyl)ethyl]acetamide and related compounds and to their preparation.

This application is a continuation-in-part of my co-pending application Serial No. 296,959, filed July 2, 1952, now Patent No. 2,680,135.

The compounds of the invention are represented by the formula (1) 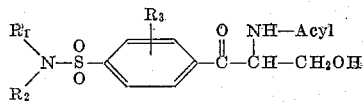

where $R_1$ and $R_2$ are the same or different and represent hydrogen, lower alkyl and hydroxyethyl, $R_3$ is hydrogen, halogen, lower alkyl or lower alkoxy radicals, and acyl is an aliphatic acid acyl radical such as, for instance acetyl, chloroacetyl, bromoacetyl, dichloroacetyl and dibromoacetyl and the like.

The terms "lower alkyl" and "lower alkoxy" as used herein include all alkyl and alkoxy radicals containing not more than six carbon atoms.

Illusrative of the compounds of the invention are:

Alpha,alpha - dichloro - N - [2 - hydroxy - 1 - (p - methylsulfamylbenzoyl)ethyl]acetamide
Alpha,alpha - dibromo - N - [2 - hydroxy - 1 - (p - dimethylsulfamylbenzoyl)ethyl]acetamide
Alpha,alpha - dichloro - N - [2 - hydroxy - 1 - (p - ethylsulfamylbenzoyl)ethyl]acetamide
Alpha,alpha - dibromo - N - [2 - hydroxy - 1 - (p - propylsulfamylbenzoyl)ethyl]acetamide
Alpha,alpha - dibromo - N - (2 - hydroxy - 1 - (p-[N - (2 - hydroxyethyl)sulfamyl]benzoyl)ethyl)acetamide
Alpha,alpha - dichloro - N - (2 - hydroxy - 1 - (p - [N,N - bis(2 - hydroxyethyl)sulfamyl]benzoyl)ethyl) - acetamide
Alpha,alpha - dichloro - N - [2 - hydroxy - 1 - (p - sulfamylbenzoyl)ethyl]acetamide
Alpha,alpha - dichloro - N - [2 - hydroxy - 1 - (p - diethylsulfamylbenzoyl)ethyl]acetamide
Alpha,alpha - dichloro - N - [2 - hydroxy - 1 - (3 - chloro - 4' -methylsulfamyl)ethyl]acetamide
Alpha,alpha - dibromo - N - [2 - hydroxy - 1 - (3 - methyl - 4 - methylsulfamylbenzoyl)ethyl]acetamide
Alpha,alpha - dichloro - N - [2 - hydroxy - 1 - (3 - ethoxy - 4 - ethylsulfamylbenzoyl)ethyl]acetamide
Alpha,alpha - dichloro - N - [2 - hydroxy - 1 - (2 - bromo - 4 - dimethylsulfamylbenzoyl)ethyl]acetamide
Alpha,alpha - dichloro - N - [2 - hydroxy - 1 - (2 - fluoro - 4 - sulfamylbenzoyl)ethyl]acetamide
Alpha,alpha - dichloro - N - [2 - hydroxy - 1 - (2 - methoxy - 4 - sulfamylbenzoyl)ethyl]acetamide
N - [2 - hydroxy - 1 - (p - methylsulfamylbenzoyl)ethyl]-acetamide
Alpha - chloro - N - [2 - hydroxy - 1 - (p - methyl - sulfamyl - benzoyl)ethyl]acetamide
Alpha - bromo - N - [2 - hydroxy - 1 - (p - methyl - sulfamylbenzoyl)ethyl]acetamide
N - [2 - hydroxy - 1 - (p - methylsulfamylbenzoyl)ethyl] - propionamide
Alpha,alpha,alpha - trifluoro - N - [2 - hydroxy - 1 - (p - methylsulfamylbenzoyl)ethyl]acetamide The compounds represented by Formula 1 may exist in optical isomeric form. In other words, the amides may exist as the (d) or (l) form or as a racemic mixture.

It will be understood that where no notation appears with a structural formula or with a chemical name the formula or name is to be interpreted in its generic sense; that is, as representing the (l) or (d) isomers in separated form as well as the (dl) optical racemate. In other words, a formula or name represents not only the unresolved mixture of isomers but also the individual isomers and racemate.

The compounds of the invention can be prepared by reacting a nitrogen-containing compound of the formula (2) 

where $R_1$ and $R_2$ have the same significance as in Formula 1 with a p - (alpha - acetamido - beta - hydroxy - propionyl)benzenesulfonyl fluoride having the formula (3) 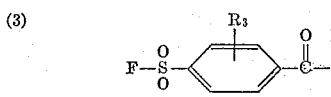

where $R_3$ and acyl have the same significance as in Formula 1.

The substituted benzenesulfonyl fluorides used in the preparation of the compounds of the invention and represented by Formula 3 are fully described and claimed in my copending application Serial No. 296,960, filed July 2, 1952, now Patent No. 2,680,134. The preparation of the fluorosulfonylphenylamido-1,3-propanediols is also described and claimed in this same copending application Serial No. 296,960, now Patent No. 2,680,134.

In brief, the fluorosulfonylphenylamidopropanediols are prepared from p-fluorosulfonylacetophenone or related compounds of the formula (4) 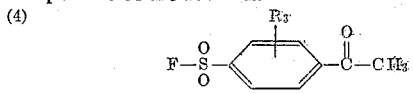

by a series of six steps which consist of halogenation, addition of hexamethylenetetramine, sulfurous acid treatment, acidification, acylation, and hydroxymethylation.

An alternative route can be diagrammatically represented as follows:

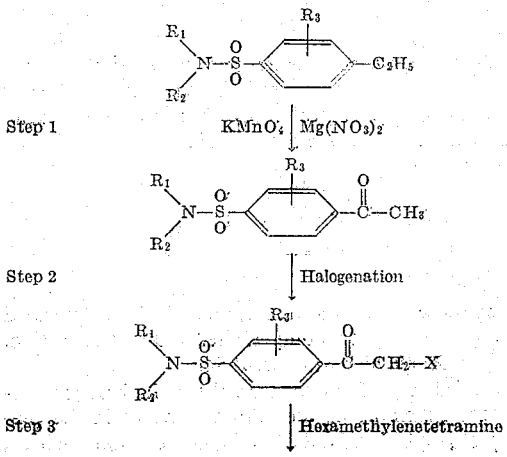

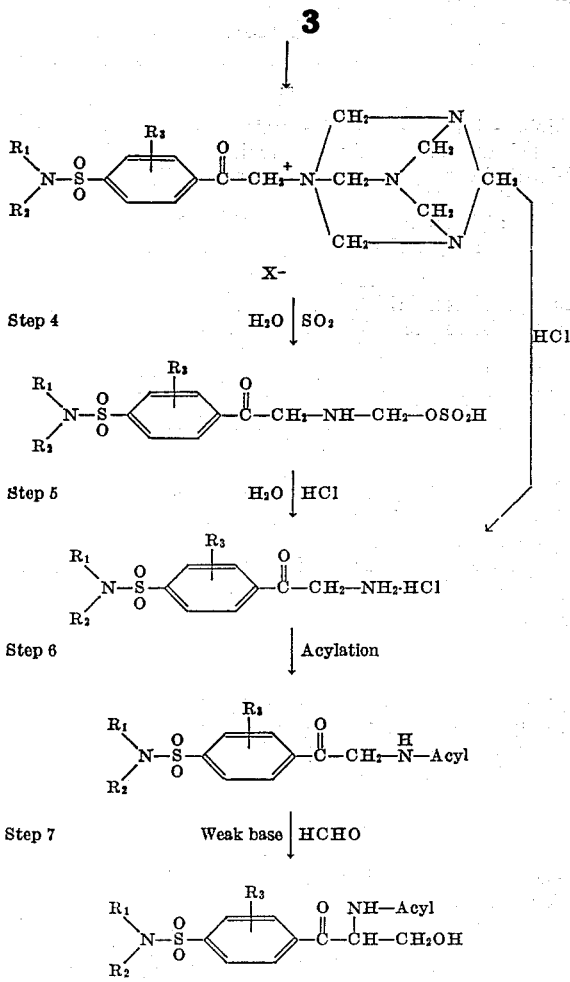

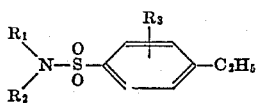

Step 4

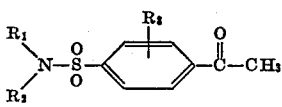

Step 5

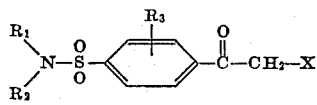

Step 6 | Acylation

[structure with R₁, R₂, R₃, —C(O)—CH₂—NH—Acyl]

Step 7 | Weak base | HCHO

[structure with R₁, R₂, R₃, —C(O)—CH(NH—Acyl)—CH₂OH]

where $R_1$, $R_2$, $R_3$ and acyl have the same significance as in formula 1 and X represents a chloro, bromo or iodo radical.

Step 1 of this alternative process involves converting a compound of the formula

[structure with R₁, R₂, R₃, —C₂H₅]

to an acetophenone of the formula

[structure with R₁, R₂, R₃, —C(O)—CH₃]

using potassium permanganate and magnesium nitrate hexahydrate. The resulting substituted acetophenone is halogenated in Step 2, preferably in glacial acetic acid, to yield a compound having the formula

[structure with R₁, R₂, R₃, —C(O)—CH₂—X]

The compounds of the above formula are fully described and claimed in my copending United States application, Serial No. 432,889, filed May 27, 1954.

In the third step of my process, the alpha-halogen substituted acetophenone of the formula shown in the preceding paragraph is mixed in a liquid medium such as, for instance, anisole, with hexamethylenetetramine to yield a hexamethylenetetraminium halide of formula

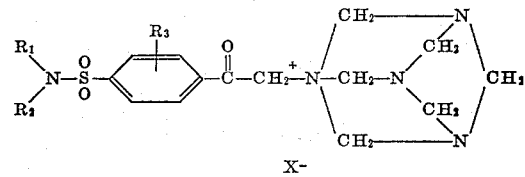

This product may be hydrolyzed directly to the aminoketone hydrochloride of Step 5, preferably in an aqueous alcoholic medium. It is also possible to proceed directly to the sulfite without isolation of the hexamethylenetetraminium halide using sulfur dioxide and water as shown on the diagram as Step 4. The substituted sulfamylacetophenone sulfite resulting from Step 4 can be readily converted into the substituted sulfamylacetophenone hydrochloride using hydrochloric acid (Step 5).

Step 6 comprises N-acylating the amine hydrochloride compound of Step 5. This step is preferably carried out using dichloroacetyl chloride but similar acid halides or acetic anhydride in the presence of a weak base, for instance, sodium acetate, may be used.

The amide derivative produced in accordance with Step 6 of my process is then subjected to an aldol type of condensation to yield a compound having the formula

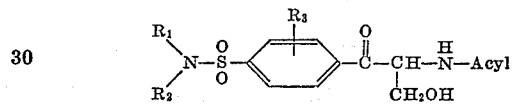

This condensation is preferably carried out in an alcoholic medium, for example, 95% ethanol or methanol, using sodium bicarbonate, or potassium carbonate, and an aqueous formaldehyde of 36–38% concentration.

The compounds of my invention are useful as chemical intermediates for antibacterial agents, such as 1-(p-dimethylsulfamylphenyl) - 2 - (alpha,alpha-dichloroacetamido)-1,3-propanediol and related compounds of my parent application. They are also useful in their own right as chemotherapeutic agents. The compounds of the present invention have been found to have antifungal and antibacterial activity against such organisms as *Candida albicans* and *Streptococcus agalactiae*.

In order to more fully understand the invention, reference should be had to the following illustrative examples:

EXAMPLE 1

Preparation of alpha,alpha-dichloro-N-[2-hydroxy-1-(p-dimethylsulfamylbenzoyl)-ethyl]acetamide

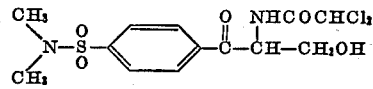

To a stirred solution of 640 g. of dimethylamine in 2 liters of water at 10° C. there is added 990 g. of p-ethylbenzenesulfonyl chloride. The temperature of the reaction mixture is kept between 10–15° C. during the chloride addition. At the end of the addition the temperature of the mixture is raised to 40° C. and maintained at 40° C. for a period of one-half hour. The resulting solution is cooled and then extracted with chloroform. The chloroform extract is distilled. The product, p-dimethylsulfamylethylbenzene, is collected at a temperature of from 178–180° C. at 10 mm. pressure. It is a white crystalline solid melting 49–51° C.

The yield of p-dimethylsulfamylethylbenzene is 864 g. The formula of p-dimethylsulfamylethylbenzene is shown below:

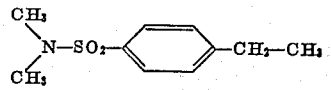

A solution of 800 g. of p-dimethylsulfamylethylbenzene in 9.5 liters of acetone is added to a mixture consisting of 570 g. of potassium permanganate and 1530 g. of magnesium nitrate hexahydrate in 9.5 liters of water warmed to a temperature of 50° C. The reaction mixture is stirred at a temperature of 50° C. for a period of two hours. Then an additional 220 g. of potassium permanganate is added. The reaction is allowed to continue for three hours.

The excess permanganate is reduced by adding sodium sulfite until the filtered solution is colorless. The manganese dioxide is removed by filtering the solution with the use of Celite Filter Aid. The filtrate, which is separated as a semi-crystalline mass, amounts to 794 g. The product can be purified by successive crystallizations from carbon tetrachloride or benzene, or it may be distilled under reduced pressure. A substantial quantity of unoxidized starting material is recovered. The product, p-dimethylsulfamylacetophenone, is a white crystalline solid melting 102–103° C., and has the following structural formula:

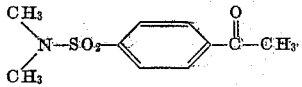

Analysis.—Calcd. for $C_{10}H_{13}NO_3S$: C, 52.84; H, 5.76; N, 6.16. Found: C, 52.79; H, 5.88; N, 6.07.

A solution of 261 g. of p-dimethylsulfamylacetophenone in 1.5 liters of glacial acetic acid is stirred at a temperature of 17–20° C. as 183.8 g. of bromine is added. An initial induction period is required for the bromination to start. This varies from 15 minutes to several hours. After the solution decolorizes, the bromine is added dropwise over a period of two hours. The resulting mixture is then poured into 5 liters of ice and water. The product separates as an oil, which soon crystallizes. The product amounts to 349 g. and has a melting range of 75–80° C. After the crude product is recrystallized twice from benzene, 244 g. of white crystalline material is obtained. M. P. 90–92° C. Additional product is recoverable from the filtrate.

The product, alpha-bromo-p-(dimethylsulfamyl)-acetophenone, has the following structural formula:

Analysis.— Calcd. for $C_{10}H_{12}BrNO_3S$: Br, 26.01. Found: Br, 25.91.

A solution of 244 g. of alpha-bromo-p-(dimethylsulfamyl)acetophenone in 1 liter of anisole is stirred at normal room temperature as 112.2 g. of hexamethylenetetramine is added. The temperature to the reaction mixture rises to 41° C. and the stirring is continued for a period of two hours. The anisole slurry is then poured into 3 liters of ice water to which 600 g. of sulfur dioxide has been added. After a period of 15 minutes, the slurry is filtered, and the solid is collected and washed with absolute ethanol and ether. A yield of 196 g. of a white powdery product is obtained. A further 135 g. of product separates from the filtrate on evaporation. The product, alpha-(hydroxymethylamino) - p - dimethylsulfamylacetophenone sulfite, has the following formula:

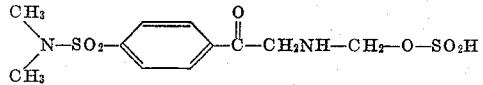

A suspension of 197 g. of alpha-(hydroxymethylamino)-p-(dimethylsulfamyl)acetophenone sulfite in a solution consisting of 197 cc. of concentrated hydrochloric acid and 394 cc. of absolute ethanol is stirred and refluxed for a period of 30 minutes. Sulfur dioxide is evolved and a substantial portion of the solid dissolves. The hot solution is filtered to remove any ammonium chloride present. On cooling the filtrate, crystals appear. They are collected on a filter, washed with ether and dried. A further quantity of product is obtained by concentrating the filtrate. A total yield of 135 g. of light tan needles is obtained. The product is alpha-amino-p-(dimethylsulfamyl)acetophenone hydrochloride and has the structure:

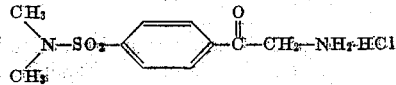

A suspension of 130 g. of alpha-amino-p-(dimethylsulfamyl)acetophenone hydrochloride in 360 cc. of freshly distilled dichloroacetyl chloride is stirred as the temperature of the suspension is raised to reflux. Hydrogen chloride is rapidly evolved and the solid dissolves. After refluxing the solution for a period of 30 minutes, the solution is cooled. The product is filtered, collected and washed with benzene and ether. The yield of product is 148 g. and has a melting point of 192–195° C. After two recrystallizations of the crude product from acetonitrile, 127 g. of white crystalline material is obtained. M. P. 196–198° C. This material is alpha, alpha - dichloro - N - (p - dimethylsulfamylphenacyl)-acetamide. Its formula is:

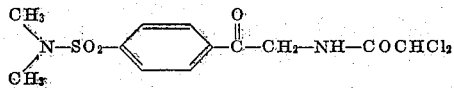

Analysis.—Calcd. for $C_{12}H_{14}Cl_2N_2O_4S$: N, 7.93. Found: N, 7.79.

A suspension of 72.6 g. of alpha, alpha-dichloro-N-(p-dimethylsulfamylphenacyl)acetamide in 320 cc. of 95% ethanol containing 1.0 g. of potassium carbonate and 25.6 cc. of 36% aqueous formaldehyde is stirred at a temperature of 35–37° C. for a period of four hours. The warm solution is filtered free of a trace of unreacted material, and the filtrate made acid by adding dilute hydrochloric acid. The filtrate is diluted with 1 liter of benzene and concentrated under reduced pressure.

The desired product crystallizes and the crystals are collected and washed with benzene. A yield of 34 g. of white crystalline product (M. P. 90–100° C.) is obtained. A further quantity of 38 g. of crude material is obtained by diluting the filtrate with benzene and concentrating further. The product is a benzene solvate of alpha, alpha-dichloro-N-[2-hydroxy-1-(p-dimethylsulfamylbenzoyl)-ethyl]acetamide. The unsolvated compound may be obtained by heating the benzene solvate under reduced pressure.

EXAMPLE 2

*Preparation of alpha, alpha-dichloro-N-[2-hydroxy-1-(p-sulfamylbenzoyl)ethyl]-acetamide*

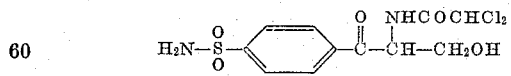

Concentrated aqueous ammonia (50 cc.) is stirred with cooling to 10° C. as 5 g. of p-[alpha-(alpha,alpha-dichloroacetamido) - beta - hydroxypropionyl]benzenesulfonyl fluoride, prepared as described in my copending U. S. application, Serial No. 296,960, filed July 2, 1952, is added slowly. The addition is made over a period of 30 minutes and the suspension is stirred until solution is complete. The excess ammonia is removed under reduced pressure, and the residue taken up in water and the pH adjusted to 4.0. The product is extracted with ether. The product, alpha,alpha-dichloro-N-[2-hydroxy-1-(p-sulfamylbenzoyl)-ethyl]acetamide, is a white crystalline solid and may be purified by crystallization from water.

EXAMPLE 3

*Preparation of alpha,alpha-dichloro-N-[2-hydroxy-1-(p-methylsulfamylbenzoyl)-ethyl]acetamide*

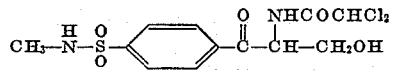

Twenty-five cc. of 25% aqueous methyl amine is cooled to 5° C. and 5 g. of p-[alpha-(alpha,alpha-dichloroacetamido) - beta - hydroxypropionyl]benzenesulfonyl fluoride is added slowly with good stirring. After the addition is complete (about 45 minutes), the mixture is stirred for an additional hour. The methylamine is distilled off under reduced pressure and the residue stirred with water. The pH of the mixture is adjusted to 4.0. The desired product may be extracted with ethyl acetate.

EXAMPLE 4

*Preparation of N - [2 - hydroxy - 1 - (p - ethylsulfamylbenzoyl)ethyl]acetamide*

Anhydrous ethyl amine (30 cc.) is stirred at 5° C. as 5 g. of p-(alpha-acetamido-beta-hydroxypropionyl)benzenesulfonyl fluoride is slowly added. The addition is made over a period of 30 minutes and stirring is continued for two hours. The ethyl amine is then distilled off under reduced pressure, and the residue taken up in water and the aqueous extract is brought to pH 4.0. The desired product crystallizes and may be purified by crystallization from ethanol.

I claim:

1. A compound of the formula

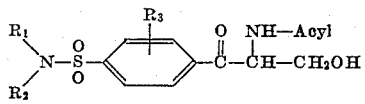

wherein $R_1$ and $R_2$ are members of the class consisting of hydrogen, lower alkyl and hydroxyethyl radicals, $R_3$ is a member of the class consisting of hydrogen, halogen, lower alkyl and lower alkoxyl radicals, and acyl is an aliphatic carboxylic acid acyl radical.

2. Alpha,alpha-dichloro-N-[2-hydroxy-1-(p-dimethylsulfamylbenzoyl)ethyl]acetamide.

3. Alpha,alpha-dichloro-N-[2-hydroxy-1-(p-sulfamylbenzoyl)ethyl]acetamide.

4. Alpha,alpha-dichloro-N-[2-hydroxy-1-(p-methylsulfamylbenzoyl)ethyl]acetamide.

5. Alpha,alpha-dichloro-N-[2-hydroxy-1-(p-ethylsulfamylbenzoyl)ethyl]acetamide.

6. A process which comprises the steps of mixing a compound of the formula

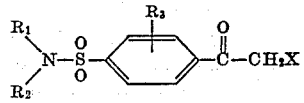

where $R_1$ and $R_2$ are members of the class consisting of hydrogen, lower alkyl and hydroxyethyl radicals, $R_3$ is a member of the class consisting of hydrogen, halogen, lower alkyl and lower alkoxyl radicals, and X is halogen, with hexamethylenetetramine and hydrolyzing the salt thus formed with hydrochloric acid in an aqueous alcoholic medium to a compound of the formula

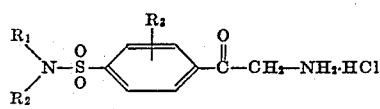

mixing the latter compound with a carboxylic acid acylating agent, recovering a compound of the formula

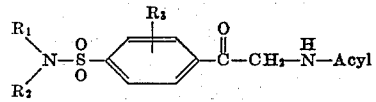

thus formed, reacting the latter product with formaldehyde in the presence of dilute alkali to obtain a compound of the formula

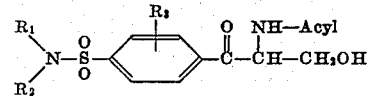

where $R_1$ and $R_2$ have the same significance as above and acyl is a carboxylic acid acyl radical.

References Cited in the file of this patent

UNITED STATES PATENTS

| | | |
|---|---|---|
| 2,680,120 | Gregory | June 1, 1954 |
| 2,680,135 | Gregory | June 1, 1954 |